(12) United States Patent
Schmitt

(10) Patent No.: US 8,444,009 B2
(45) Date of Patent: May 21, 2013

(54) OBJECT BLOCK MAGAZINE

(75) Inventor: Christoph Schmitt, Schriesheim (DE)

(73) Assignee: Leica Biosystems Nussloch GmbH (DE)

( * ) Notice: Subject to any disclaimer, the term of this patent is extended or adjusted under 35 U.S.C. 154(b) by 1023 days.

(21) Appl. No.: 12/262,008

(22) Filed: Oct. 30, 2008

(65) Prior Publication Data

US 2009/0148264 A1 Jun. 11, 2009

(30) Foreign Application Priority Data

Dec. 10, 2007 (DE) .......................... 10 2007 059 392

(51) Int. Cl.
*B65H 1/12* (2006.01)

(52) U.S. Cl.
USPC ............................................ 221/89; 221/268

(58) Field of Classification Search
USPC ........... 221/64, 69, 75, 76, 79, 80, 81, 87–89, 221/92, 133, 186, 191, 197, 198, 208, 209, 221/224, 226, 231–234, 239, 261, 268, 270, 221/272, 277, 279, 292
See application file for complete search history.

(56) References Cited

U.S. PATENT DOCUMENTS

| | | | | |
|---|---|---|---|---|
| 2,718,299 A | * | 9/1955 | Atwater et al. | 206/537 |
| 2,935,180 A | * | 5/1960 | Von Martens | 206/535 |
| 3,040,929 A | * | 6/1962 | Tapper | 221/246 |
| 3,691,988 A | | 9/1972 | Clarke | |
| 4,187,077 A | * | 2/1980 | Covington et al. | 422/63 |
| 2005/0235542 A1 | | 10/2005 | Metzner et al. | |

FOREIGN PATENT DOCUMENTS

| | | |
|---|---|---|
| DE | 2 306 967 | 9/1973 |
| DE | 202004006265 | 7/2004 |

OTHER PUBLICATIONS

German Examination Report, dated Feb. 12, 2008, for German priority application.
United Kingdom Search and Examination Report dated, Oct. 31, 2008, in related UK application.
German Examination Report dated Feb. 12, 2008.

* cited by examiner

*Primary Examiner* — Gene Crawford
*Assistant Examiner* — Kelvin L Randall, Jr.
(74) *Attorney, Agent, or Firm* — Nelson Mullins Riley & Scarborough, LLP

(57) ABSTRACT

A magazine having compartments for receiving cassettes has an outer housing having an open top and an open front side. An inner housing within the outer housing encloses an interior space and defines a plurality of compartments. The inner housing has opposing sidewalls, and spring elements form the compartments. A generally U-shaped feed element is mounted on the inner housing movably reciprocally in the longitudinal direction over a depth of the compartment so that the feed element moves a cassette from one compartment to an adjacent compartment.

11 Claims, 5 Drawing Sheets

OBJECT BLOCK MAGAZINE

The invention relates to a magazine having compartments for receiving cassettes.

BACKGROUND OF THE INVENTION

Slide magazines are known magazines having compartments for receiving cassettes. Such magazines may also be used, however, as an accessory part for microtome devices for receiving cassettes with medical samples (object blocks) embedded therein (DE 20 2004 006 U1). For processing a sample, the cassette is taken out of the magazine by a supply device allocated to the microtome device. To this end, the entire magazine is displaced so far that the respective cassette to be taken out is located in a receiving area of the supply device. The necessary travel and guide distance for a magazine corresponds to the length of the entire magazine.

The displacement of the magazine is necessary when cassettes are to be taken from the magazine in an arbitrary order. Within the framework of an increasingly automated sample processing, however, the cassettes are often processed step-by-step one after the other in accordance with their placement in the magazine. To this end, too, a conventional magazine has to be displaced over its entire length.

U.S. Pat. No. 3,691,988 discloses a device for staining samples on object carriers for microscopes. The sample carriers can be immersed in various containers with staining solutions within a housing.

U.S. Pat. No. 3,040,929 discloses a storage container for tablets that includes a displacement mechanism that can be moved back and forth and by means of which the tablets can be dispensed from the storage container one after the other.

DE 2 306 967 discloses a device for the output of objects from a vending machine, in which a back and forth two-way translational motion is converted into an intermittent one-way translational motion.

SUMMARY OF THE INVENTION

Accordingly, one object of one or more embodiments of the invention to provide a magazine which allows cassettes to be provided step-by-step one after the other at a predetermined unloading station and that can be arranged in a space-saving manner at a processing station.

These and other objects may be achieved by one or more embodiments described herein. In one embodiment, a magazine is comprised of a stationary outer housing so that at the processing station, no transport devices for the provision of the cassettes have to be provided. Given the same number of compartments in the inner housing as in the case of conventional magazines, the entire length of the outer housing is longer by only about two compartment depths. Since the device for the step-wise advance of the cassettes from one compartment to the next is integrated into the outer housing of the magazine, a particularly simple connection of the magazine to the processing station is possible.

BRIEF DESCRIPTION OF THE DRAWINGS

One or more embodiments of the inventive magazine are illustrated schematically in the drawing and will be described in more detail with reference to the figures.

Figure 1:
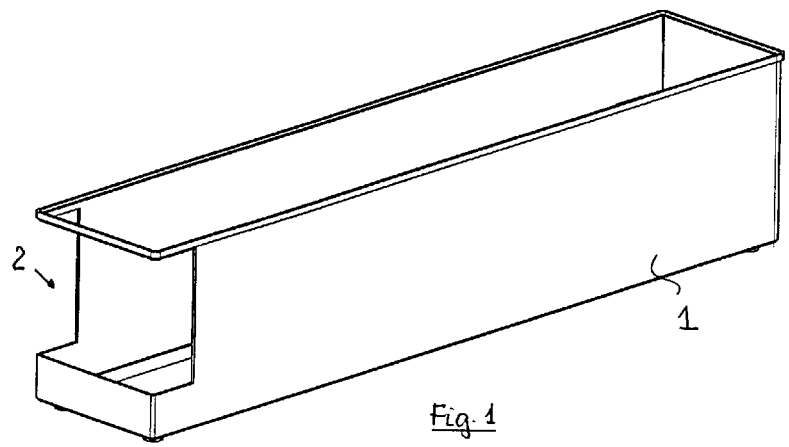
FIG. 1 is a perspective view of an outer housing of a magazine according to an embodiment of the present invention.

Repeat use of reference characters in the present specification and drawings is intended to represent some or analogous features or elements of the invention.

DETAILED DESCRIPTION

Reference will be made in detail to one or more embodiments of the present invention, one or more examples of which are illustrated in the accompanying drawings.

Figure 2:
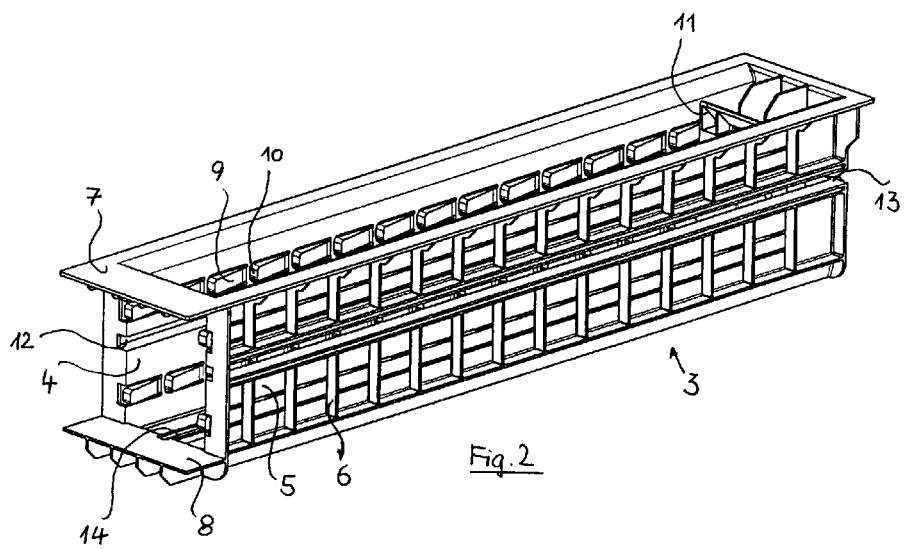
FIG. 2 is a perspective view of an inner housing for use with the outer housing of FIG. 1.

FIG. 1 illustrates an outer housing 1 that is open at the top and at one front side 2. An inner housing 3 illustrated in FIG. 2 is likewise open at the top. Side walls 4, 5 are reinforced by vertical ribs 6 on the outside. At the top, inner housing 3 has a surrounding frame 7 which is inserted into the upper edge of the outer housing 1. Inner housing 3 is likewise open at its front side directed to the front side 2 of the outer housing 1 after insertion into the outer housing. In the lower area of this front side, a platform 8 is molded.

In each of the side walls 4, 5, two parallel rows of spring elements 9 are present. The spring elements include spring heads 10 that are directed toward the open front side and project from the side walls 4, 5 into an interior space defined by the inner housing. Four spring heads 10 lying in a common plane form a bearing surface for a cassette 11 inserted into the inner housing 3.

In each of the side walls 4, 5, guiding slots 12, 13 are formed in the longitudinal direction of the inner housing 3. Guiding slots 12, 13 are open at the end of the inner housing 3 opposite the open front side. A further guiding slot 14 is arranged in the bottom of the inner housing 3.

Figure 3:
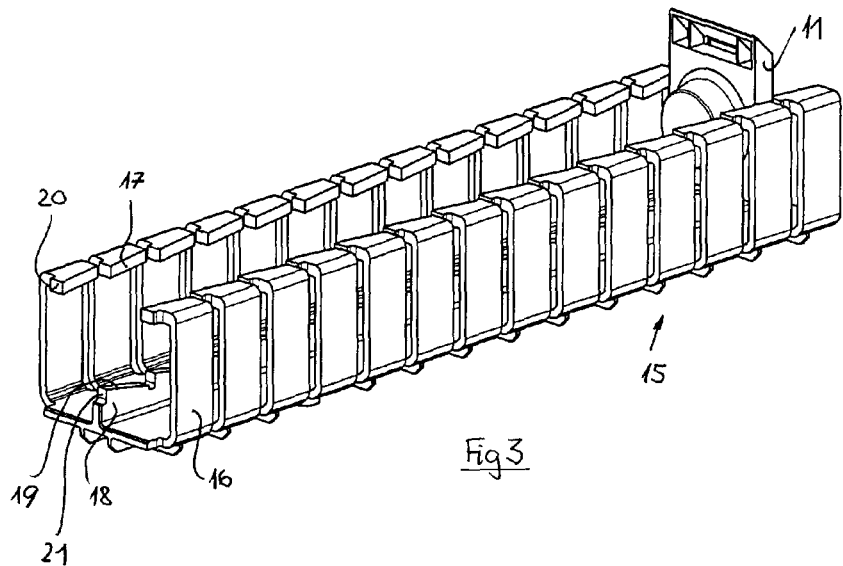
FIG. 3 is a perspective view of a feed element for use with the outer and inner housings of FIGS. 1 and 2.

The feed element 15 illustrated in FIG. 3 has a U-shaped cross-section. U-shaped legs formed as elastic segments 16 extend from the bottom of the feed element 15. At a top end, segments 16 are provided with inwardly directed wedge elements 17. The length of the wedge elements 17 corresponds to the length of the spring elements 9.

In the bottom area, the feed element 15 comprises a web 18 with ramp elements 19, the length of which likewise corresponds to the length of the spring elements 9. Wedge elements 17 have heads 20, and ramp elements 19 have ramp heads 21, that lie in a common plane.

Feed element 15 is pushed on the inner housing 3 so that wedge elements 17 and the web 18 are received in guiding slots 12, 13 and 14 and so that the feed element encloses the inner housing 3 in the longitudinal direction. The insertion direction is chosen such that the wedge heads 20 and the ramp heads 21 are directed toward the open front side of the inner housing 3. In a basic position, the spring heads 10, the wedge heads 20 and the ramp heads 21 lie in a common plane and form the bearing surface for a cassette 11 in a compartment. For compensation of manufacturing tolerances, the ramp heads 21 can also lie slightly outside the compartment and the associated compartment plane in the basic position. The length of the feed element 15 is adapted such that it can be displaced back and forth by one compartment depth on the inner housing 3. One compartment depth is defined by the distance between two successive compartment planes.

Figure 4:
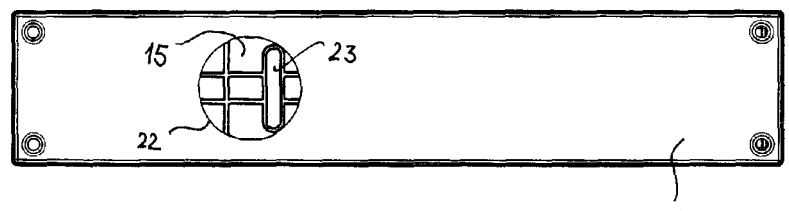
FIG. 4 is a bottom view of the outer housing of FIG. 1.

A bottom view of the outer housing 1 illustrated in FIG. 4 shows a circular opening 22 and a partial bottom view of feed element 15. This underside of the feed element has a groove 23 perpendicular to the feed direction in the illustrated area. The diameter of the opening 22 is sufficiently large that groove 23 lies within the opening 22 for a complete course of feed element 15.

Figure 5:
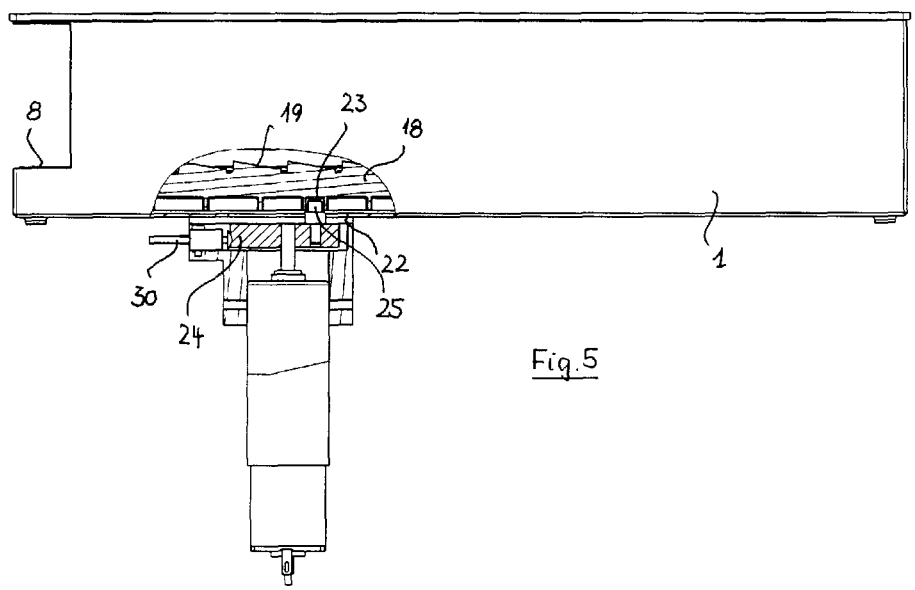
FIG. 5 is a side and partial cutaway view of the magazine of FIGS. 1-3 and shows a drive for the feed element.

A drive for the feed element 15 illustrated in FIG. 5 includes a rotary disc 24, the diameter of which is adapted to the circular opening 22. On the rotary disc 24 an eccentric pin 25 projecting toward the magazine is arranged which meshes with the groove 23. The eccentric radius, i.e. the distance between the axis of the eccentric pin 25 and the rotary axis of the rotary disc 24, corresponds to half a compartment depth of the magazine. Given a complete revolution of the rotary disc 24, the feed element 15 is therefore displaced back and forth by means of the eccentric pin 25 by one compartment depth. Integrated in the drive unit is a sensor 30, by means of which the current position of the rotary disc 24 with eccentric pin 25 can be detected.

Figure 6:
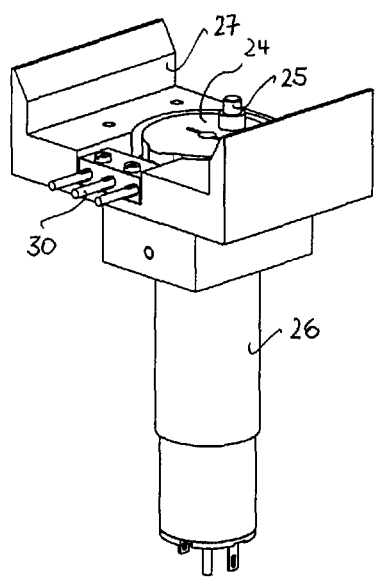
FIG. 6 is a perspective view of a separate magazine mount with drive unit for use with a magazine according to an embodiment of the present invention.

FIG. 6 shows a drive unit with motor 26, rotary disc 24, eccentric pin 25 and magazine mount 27 as a separate unit. However, it is likewise possible to integrate the rotary disc 24 with eccentric pin 25 into the outer housing 1 so that the magazine is placed in the magazine mount 27 and onto the rotary axis of the motor 26.

Figure 7:
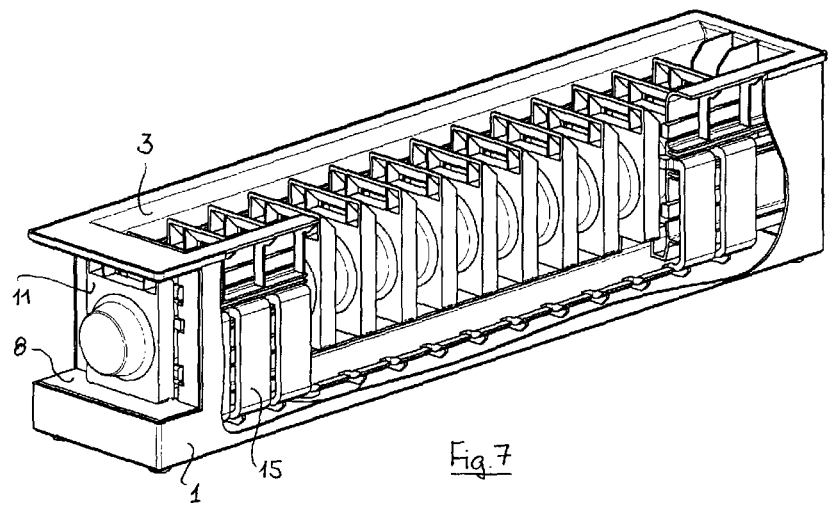
FIG. 7 is a view of the assembled magazine of FIGS. 1, 2 and 3.

FIG. 7 shows in a partially sectional perspective view an assembly of the magazine formed of outer housing 1, inner housing 3 and feed element 15. The compartments of the magazine are filled with cassettes 11. One cassette 11 is provided on the platform 8 for withdrawal.

Figure 8:
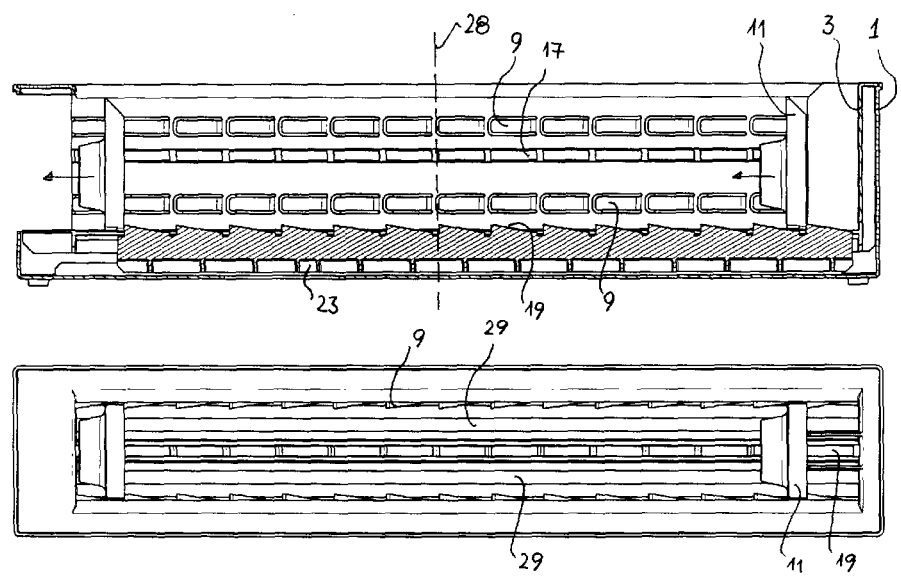
FIG. 8 illustrates longitudinal sections as elevation and top views of the magazine of FIGS. 1-3.

The cross-sections in FIG. 8 correspond to the basic position of a filled magazine, with retracted feed element 15. From the upper longitudinal section, the row-like arrangement of the spring elements 9, the wedge elements 17 and the ramp elements 19, with their heads defining a compartment abutment plane 28, can be seen. The longitudinal cross-section from above shows the spring elements 9 projecting into the interior space.

Figure 9:
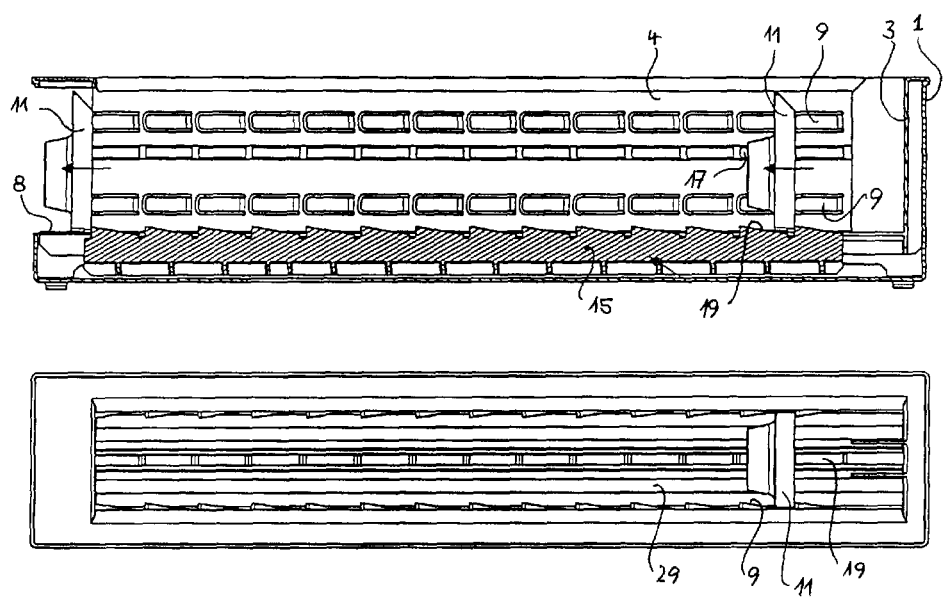
FIG. 9 illustrates longitudinal sections as in FIG. 8, in an advance position.

FIG. 9 shows the same cross-sections as in FIG. 8, except that the feed element is advanced and a cassette 11 is pushed onto the platform 8. The rear cassette 11 as seen in the feed direction is advanced by one compartment depth. During the feed, this cassette 11 has pushed the spring elements 9 lying in front of it into the side wall 4 of the inner housing 3, starting out from the bottom of the spring elements 9. The cassettes slide on tracks 29 on the bottom of the inner housing 3 during the feed.

When the feed element 15 is retracted, the wedge element 17 situated in the new compartment position of the cassette 11 is pressed outwardly along the wedge surface by the cassette 11. The ramp elements 19 lift the cassette 11. After the feed element 15 has been completely retracted, the cassettes 11 again fall back onto the tracks 29 in front of the ramp heads 21, and the wedge elements 19 again project into the interior space of the inner housing 3 behind the cassette 11.

The magazine according to the invention is preferably provided for receiving cassettes with object blocks. Of course, the dimensions of the spring, wedge and ramp elements can also be adapted to the receipt and the feed of, for example, object carriers.

While one or more embodiments of the present invention have been described above, it should be understood that any and all equivalent realizations of the present invention are included within the scope and spirit thereof. Thus, the embodiments presented herein are provided by way of example only.

What is claimed is:

1. A magazine having compartments for receiving cassettes, comprising:
   an outer housing having an open top and an open front side;
   an inner housing disposed within the outer housing and that defines an interior space and a plurality of compartments, the inner housing having opposing side walls, and each compartment being formed by at least two spring elements integrated respectively into the side walls symmetrically with respect to a longitudinal direction and projecting into the interior space, wherein the spring elements have respective spring heads directed toward the open front side of the outer housing;
   a generally U-shaped feed element mounted on the inner housing movably reciprocally in the longitudinal direction over a depth of a said compartment so that the feed element moves a cassette from one said compartment to an adjacent said compartment and so that the cassette pushes a pair of opposing said spring elements outward with respect to the interior space;
   wherein the feed element has at least two wedge elements for each compartment which project elastically into the interior space proximate the side walls of the inner housing, and wherein the wedge elements have wedge heads directed toward the open front side of the outer housing; and
   wherein the spring heads and the wedge heads in a compartment lie in a common compartment plane to form a bearing surface for a cassette.

2. The magazine according to claim 1, wherein
   each compartment is formed respectively by two pairs of said spring elements,
   one of the two pairs of spring elements is above the wedge elements, and
   the other of the two pairs of spring elements is below the wedge elements.

3. The magazine according to claim 1, wherein the feed element has a web with fixed ramp elements in a bottom area of the compartments, and wherein, for each compartment, a respective ramp element has a ramp head that lies in the compartment plane.

4. The magazine according to claim 1, wherein the spring elements are arranged in rows parallel to the longitudinal direction.

5. The magazine according to claim 1, wherein the side walls of the inner housing define respective guiding slots extending in the longitudinal direction and into which the wedge elements of the feed element are inserted.

6. The magazine according to claim 3, wherein a bottom of the inner housing defines a guiding slot extending in the longitudinal direction and into which the web of the feed element is inserted.

7. The magazine according to claim 1, wherein the open front side of the outer housing has a platform for receiving a cassette pushed out of the inner housing.

8. The magazine according to claim 1, wherein a bottom of the outer housing defines an opening, wherein a bottom of the feed element defines a groove aligned with the opening and that extends transverse to the longitudinal direction, and wherein a size of the opening in the longitudinal direction is at least as large as reciprocal movement of the feed element in the longitudinal direction.

9. The magazine according to claim 8, wherein the opening is circular, wherein an eccentric pin of a rotary disc projects through the opening into the interior space and meshes with the groove, and wherein the eccentric pin defines an eccentric radius with respect to the rotary disc that corresponds to half of one said depth of a compartment in the longitudinal direction.

10. The magazine according to claim 1, wherein
the spring elements are configured so that, during feeding of a first cassette, first said spring elements lying in front of the first cassette are pushed into the side walls and, when the first cassette advances past the first spring elements, the first spring elements again project from the side walls and into the compartment plane behind the first cassette, and
the wedge elements are configured so that, during retraction of the feed element, first said wedge elements are pushed into the side walls by a resting said cassette and again project into the compartment plane behind the resting cassette.

11. The magazine according to claim 10,
wherein the feed element has a web with fixed ramp elements in a bottom area of the compartments, and wherein, for each compartment, a respective ramp element has a ramp head that lies in the compartment plane, and
wherein, during retraction of the feed element, the resting cassette is lifted by the web over one said ramp and falls back in front of the ramp head of the one ramp.

* * * * *